United States Patent
Bang

(10) Patent No.: US 7,229,289 B2
(45) Date of Patent: Jun. 12, 2007

(54) SIGNAL CONNECTING APPARATUS FOR A FOLDER TYPE MOBILE TERMINAL

(75) Inventor: Sung-Eun Bang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/016,308

(22) Filed: Dec. 17, 2004

(65) Prior Publication Data

US 2005/0136696 A1    Jun. 23, 2005

(30) Foreign Application Priority Data

Dec. 19, 2003   (KR) .................. 10-2003-0094038

(51) Int. Cl.
*H01R 39/00* (2006.01)
(52) U.S. Cl. ........................................... 439/31
(58) Field of Classification Search ............... 439/11, 439/31, 164, 165
See application file for complete search history.

(56) References Cited

U.S. PATENT DOCUMENTS

| | | | | |
|---|---|---|---|---|
| 3,860,312 A | * | 1/1975 | Gordon, Jr. ............... 439/31 |
| 5,237,488 A | * | 8/1993 | Moser et al. ............... 361/681 |
| 5,897,382 A | * | 4/1999 | Takahashi .................. 439/31 |
| 5,927,997 A | * | 7/1999 | Ruland et al. ............... 439/31 |
| 5,995,373 A | * | 11/1999 | Nagai ........................ 361/755 |
| 6,272,324 B1 | | 8/2001 | Rudisill et al. |
| 6,808,402 B2 | * | 10/2004 | Ryu et al. .................. 439/165 |
| 6,857,879 B2 | * | 2/2005 | Sawada et al. ............. 439/31 |

FOREIGN PATENT DOCUMENTS

EP           0 836 308 A1      4/1998

* cited by examiner

*Primary Examiner*—Gary Paumen
(74) *Attorney, Agent, or Firm*—Lee, Hong, Degerman, Kang & Schmadeka

(57) ABSTRACT

A signal connecting apparatus of a mobile communication terminal is disclosed. A signal connecting apparatus comprises a plurality of connectors for providing reciprocal rotation to exchange signals between a main board of a first portion of the folder type mobile terminal, and a display portion of a second portion of the folder type mobile terminal, wherein the second portion is rotatably connected to open and close relative to the first portion.

32 Claims, 3 Drawing Sheets

SIGNAL CONNECTING APPARATUS FOR A FOLDER TYPE MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2003-0094038 filed on Dec. 19, 2003, contents of which are hereby incorporated by reference herein in its entirety.

BACKGROUND OF THE INVENTION

1. Field of the Invention

The present invention relates to a signal connecting apparatus for a folder type mobile terminal, and more particularly, to a signal connecting apparatus capable of enhancing reliability for exchanging signals between a first portion rotatably connected with a second portion and having increased strength against an external impact or torsional force.

2. Description of the Related Art

A folder type mobile terminal has a folder portion rotatably mounted about a hinged portion with a body.

According to the conventional art, a main board inside the body is connected to an inner circuit board of the folder portion using a flexible printed circuit board to transmit a signal between the body and the folder portion.

The conventional folder type mobile terminal will be explained in more detail as follows with reference to the attached drawings.

FIG. 1 is a frontal view illustrating an opened state of a folder type mobile terminal in accordance with the conventional art. FIG. 2 is a schematic view showing an inner structure of the folder type mobile terminal in accordance with FIG. 1.

A conventional folder type mobile terminal includes a body 1 and a folder portion 2 rotatably coupled to the body 1 centered about a hinged portion 3.

The body 1 is provided with a keypad 4 for inputting information. The folder portion 2 is provided with a display portion 5 for displaying characters and/or images.

The display portion 5 of the folder portion 2 is connected to a printed circuit board 6. The printed circuit board 6 disposed in the body 1 connects through a flexible printed circuit board (FPCB) 7 to the display portion 5. The FPCB 7 installation includes passing through the hinged portion 3, and bends when the folder portion 2, centered about the hinged portion 3, is rotated.

The FPCB 7 includes, in this example, a copper wire having more than 4 layers and approximately 20 data lines. In yet another example, the display portion 5 may create 65,000 colors and form 8 to 16 data lines, or alternatively more than 2 data lines may be formed for increasing brightness of an image or providing additional signal driver capability.

When the FPCB is used as a signal transmission medium between the body and the folder portion, long data lines are created along the FPCB. The long data lines create, upon data transmission, a time difference due to capacitances within of the data lines. An operation is performed to prevent generating the time difference. The operation is not easy to perform reliably. The operation results in time delays and increased costs for a mobile terminal.

Upon the folder portion or the body being rotated, the FPCB generates torsional forces during flexing which may damage the FPCB resulting in severing a data line. The severed data line in the FPCB will result in the display portion 5 becoming white or not outputting an image.

A repair of the severed data line is extremely difficult resulting in a FPCB requiring replacement. The replacement cost for an FPCB may be high. However if the FPCB is not replaced, the terminal may have degraded efficiency.

Therefore, there is a need for a system that overcomes the above problems and provides advantages over other signal connecting apparatuses.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, the apparatus comprising a plurality of connectors for providing reciprocal rotation to exchange signals between a main board of a first portion of the folder type mobile terminal and a display portion of a second portion of the folder type mobile terminal, wherein the second portion is rotatably connected to open and close relative to the first portion.

The plurality of connectors preferably comprise a first connector electrically connected to the main board and installed on an inner circumferential surface of a connection part, a second connector electrically connected to the display portion and installed on the inner circumferential surface of the connection part, and a third connector installed between the first connector and the second connector passing through a central axis of the connection part for electrically connecting the first connector and the second connector.

The first connector preferably comprises a first base plate installed on an inner circumferential surface of the connection part electrically connected to the main board. The third connector preferably comprises a cylindrical portion installed along the central axis of the connection part, and third connector terminals protrude along an outer circumferential surface of the cylindrical portion electrically connected to first connector terminals of the first connector and second connector terminals of the second connector for providing signal electrical conductivity.

The first connector further preferably comprises first connector terminals formed along a surface of the first base plate and electrically connected to the third connector. The first connector terminals may protrude towards the central axis of the connection part. The first connector terminals are formed within a specified interval along a longitudinal direction of the connection part.

The second connector preferably comprises a second base plate installed on an inner circumferential surface of the connection part electrically connected to the display portion.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

The invention will be described in detail with reference to the following drawings in which like reference numerals refer to like elements wherein:

FIG. 1 is a front view illustrating a state that a second portion of a folder type mobile terminal is opened in accordance with the conventional art.

FIG. 2 is a schematic view illustrating an interior view of the folder type mobile terminal in accordance with the conventional art.

FIG. 3 is a schematic view illustrating an interior view of the folder type mobile terminal according to an embodiment of the present invention.

FIG. 4 is a front view illustrating one embodiment of a signal connecting apparatus according to an embodiment of the present invention.

FIG. 5 is a sectional view illustrating a first lateral view of the signal connecting apparatus of FIGS. 3 and 4 according to an embodiment of the present invention.

FIG. 6 is a sectional view illustrating a second lateral view of the signal connecting apparatus of FIGS. 3, 4, and 5 according to an embodiment of the present invention.

DETAILED DESCRIPTION OF THE PREFERRED EMBODIMENTS

The invention relates to a signal connecting apparatus for a folder type mobile terminal.

Although the invention is illustrated with respect to a folder type mobile terminal, it is contemplated that the invention may be utilized anywhere it is desired for providing a signal connecting apparatus for transporting signals from one location to another location. Reference will now be made in detail to the preferred embodiments of the present invention, examples of which are illustrated in the accompanying drawings.

Figure 1:
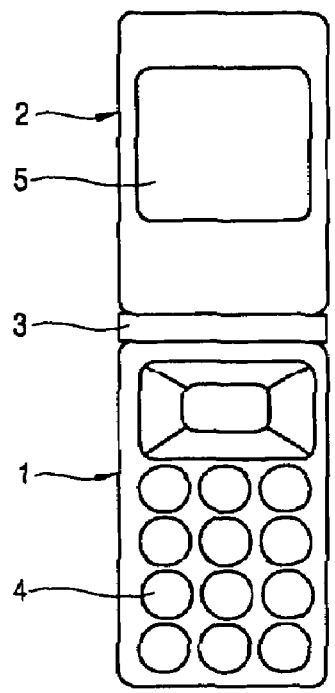
Figure 2:
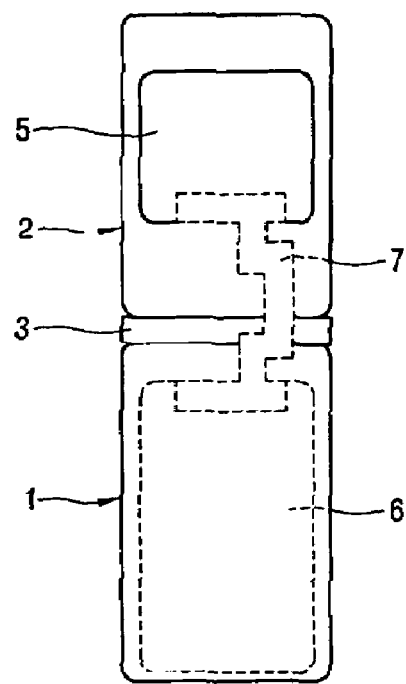
Figure 3:
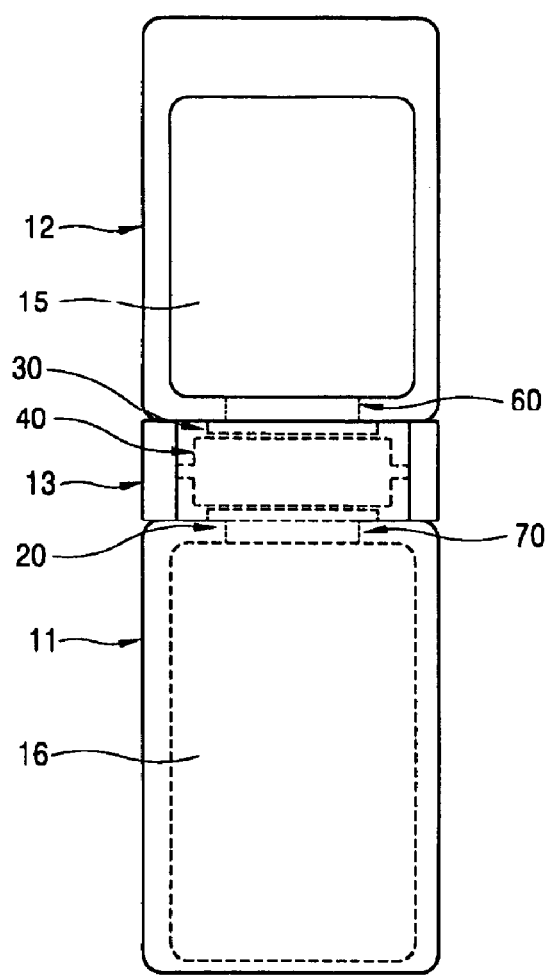

FIG. 3 is a schematic view illustrating an interior view of a folder type mobile terminal according to the present invention. The folder type mobile terminal according to one embodiment of the present invention provides a first portion 11 having a main board 16, and a second portion 12 having a display portion 15 and rotatably connected to the first portion 11 by a connection part 13. In one exemplary example, the first portion is the body of the mobile terminal and the second portion is the folder portion of the mobile terminal. The signal connecting apparatus provides a plurality of connectors installed in the connection part 13. The plurality of connectors may perform a reciprocal rotation while maintaining electrical connection to provide signal exchange between the main board 16 and the display portion 15 while the second portion 12 is opened and closed relative to the first portion 11.

Construction of the signal connecting apparatus for electrically connecting the main board 16 of the first portion 11 and the display portion 15 of the second portion 12 will be explained below.

Figure 4:
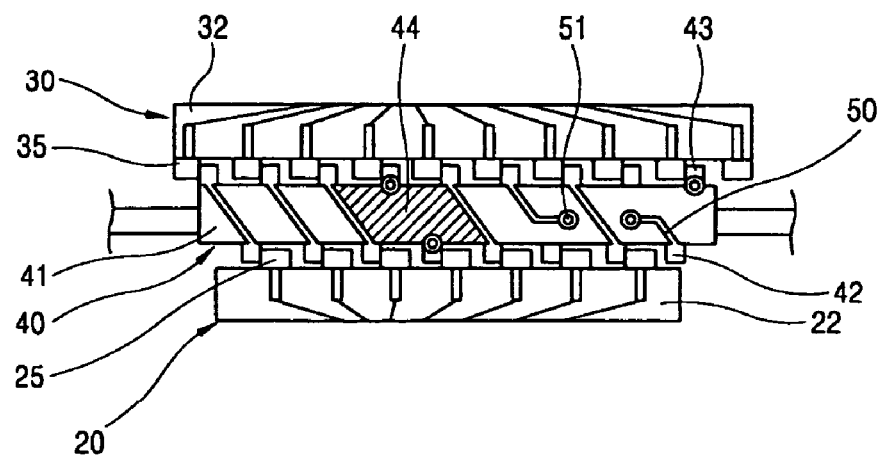

FIG. 4 is a front view illustrating the signal connecting apparatus of FIG. 3 according to an embodiment of the present invention.

The signal connecting apparatus comprises a first connector 20 electrically connected to the main board 16 and installed on an inner circumferential surface of the connection part 13, a second connector 30 electrically connected to the display portion 15 and installed on the inner circumferential surface of the connection part 13, and a third connector 40 installed between the first connector 20 and the second connector 30 passing through a central axis of the connection part 13 for electrically connecting the first connector 20 and the second connector 30.

When the second portion 12 is opened or closed relative to the first portion 11, the plurality of connectors 20, 30, and 40 are reciprocally rotated while maintaining electrically connectivity with the first portion 11 and the second portion 12. A signal transmission is performed between the first portion 11 and the second portion 12.

The first connector 20 provides a first base plate 22 installed on the inner circumferential surface of the connection part 13, which is electrically connected to the main board 16 of the first portion 11. First connector terminals 25 of the first connector 20 are electrically connected to the third connector 40 along a surface of the first base plate 22.

The first connector terminals 25 protrude toward a central axis of the connection part 13, and are formed along a longitudinal direction of the connection part 13.

The second connector 30 provides a second base plate 32 installed on the inner circumferential surface of the connection part 13 for electrical connection to the display portion 15 of the second portion 12. Second connector terminals 35 of the second connector 30 are electrically connected to the third connector 40 along a surface of the second base plate 32.

The second connector terminals 35 protrude toward a central axis of the connection part 13, and are formed within a specified interval along a longitudinal direction of the connection part 13. The connection part 13 has a plurality of connection terminals along an outer circumstantial surface.

Figure 5:
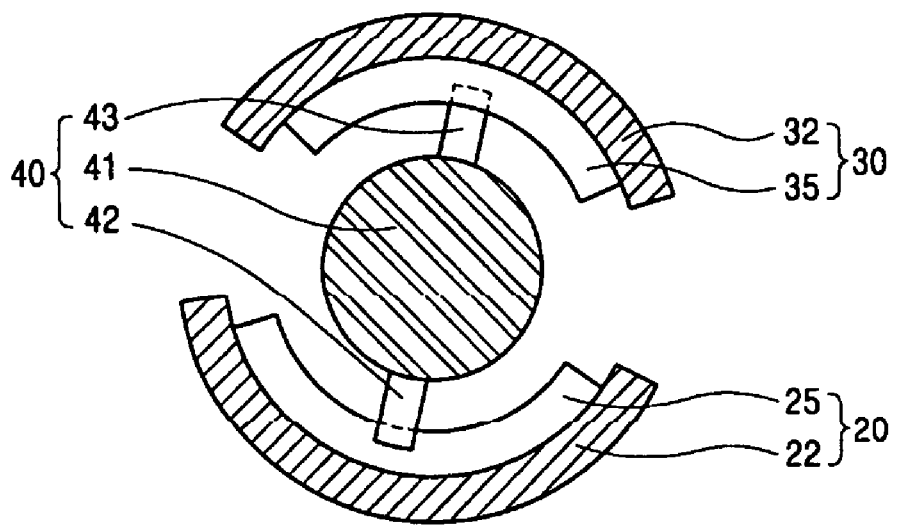

FIG. 5 is a sectional view illustrating a first lateral view of the signal connecting apparatus of FIGS. 3 and 4 according to one embodiment of the present invention.

To electrically connect the first connector terminals 25 to the second connector terminals 35, the third connector 40 is installed along the central axis of the connection part 13. The third connector 40 provides a cylindrical portion 41 installed at the center of the connection part 13 in a direction of the central axis of the connection part 13, and a plurality of connection terminals protrude along an outer circumferential surface of the cylindrical portion 41.

The cylindrical portion 41 of the third connector 40 firmly installs on the circumferential surface of the connection part 13. The cylindrical portion 41 is preferably formed of metal not easily bent or the like.

The third connector 40 provides first connection terminals 42 to electrically connect to the first connector terminals 25. The third connector 40 provides second connection terminals 43 to electrically connect to the second connector terminals 35.

The first connection terminals 42 protrude from an outer circumferential surface of the cylindrical portion 41 of the third connector 40 towards an inner circumferential surface of the connection part 13, and are formed within a specified interval along a longitudinal direction of the cylindrical portion 41.

A lateral surface, a contact, of each of the first connection terminals 42 contacts with a lateral surface of each of the first connector terminals 25. At least one of the first connection terminals 42 is positioned with the connection terminals 25. A lateral surface of each of the first connection terminals 42 contacts a lateral surface of at least one first connector terminal 25 between connection terminals positioned along both sides of the first connection terminal 42.

At least one of the second connection terminals 43 protrude from an outer circumferential surface of the cylindrical portion 41 of the third connector 40 towards the inner circumferential surface of the connection part 13, and are formed within a specified interval along a longitudinal direction of the cylindrical portion 41.

A lateral surface of at least one of the second connection terminals 43 connects with a lateral surface of at least one of the second connector terminals 35. The second connection terminals 43 are positioned between the second connector terminals 35 of the second connector 30. A lateral surface of at least one of the second connection terminals 43 connects with a lateral surface of one connection terminal of the second connector 30 between the connection terminals positioned along both sides of the second connection terminal 43.

The first connection terminals 42 and the second connection terminals 43 form an alternating pattern along a longitudinal direction of a cylindrical portion of the third connector 40.

When the first connector 20, the second connector 30, and the third connector 40 engage, terminal positions of each of these connectors includes the connection terminals 25 preferably rotating about the first connection terminals 42, and the connection terminals 35 preferably rotating about the second connection terminals 43.

A conductive circuit pattern 50 is formed along a surface of the cylindrical portion 41 of the third connector 40 to electrically connect a signal between the first connection terminals 42 and the second connection terminals 43.

An insulating layer 44, illustrated in FIG. 4, is formed along an outer circumferential surface of the cylindrical portion 41 for reliably exchanging signals between the first connection terminals 42 and the second connection terminals 43 to prevent cross-wiring of, for example, electrical connections on the main board. The conductive circuit pattern 50 is preferably formed on the insulating layer 44 for maintaining data lines and power lines.

The conductive circuit pattern 50 is preferably formed after forming the first connection terminals 42 and the second connection terminals 43. In another alternative, the first connection terminals 42, the second connection terminals 43, and the conductive circuit pattern 50 are fabricated as one unit.

A plurality of vias 51 are preferably formed on the conductive pattern 50 for obtaining additional data lines if predetermined data lines are not available.

The first and second base plates 22 and 32 of the first and second connectors 20 and 30 and the connector terminals 25 and 35 formed protrude in a circumferential direction of the connection part 13 within a specified length, and rotate along an outer circumferential surface of the third connector 40. The first and second base plates 22 and 32 and the connection terminals 25 and 35 are preferably formed as a circular arc shape.

Each end of the first connection terminals 42 and the second connection terminals 43 protrude from an outer circumferential surface of the cylindrical portion 41 to form a gap with the first and second base plates 22 and 32. The first and second connection terminals 42 and 43 may perform a relative rotation while contacting the connection terminals of the first and second connectors 20 and 30.

An installation position of the first and second base plates 22 and 32 of and a length of the connection terminals 25 and 35 along a circumferential direction of the connection part 13 may be modified by redesigning the connection part 13.

When the second portion 12 is closed, an electric signal is continuously connected to components between the main board 16 of the first portion 11 and the display portion 15 of the second portion 12 electrically powered, and no electrical power is connected to other non-electrically powered components.

When the second portion 12 is opened, a maximum open angle between the second portion 12 and the first portion 11, and a rotation range up to the opened angle have to be considered.

The main board 16 of the first connector 20 is electrically connected to the display portion 15 of the second connector 30 by connection members 60 and 70. In another example, connection members 60 and 70, a receptacle, a soft PCB, a hard PCB, etc. may be installed in accordance with installation of the connection part 13.

The first connector 20 and the second connector 30 are affixed to an inner circumferential surface of the connection part 13 at a certain position, and the third connector 40 is rotated. The first connector 20, the second connector 30, and the third connector 40 perform a relative rotation. Upon a relative rotation among the first connector 20, the second connector 30, and the third connector 40, a signal transmission is performed between the first portion 11 and the second portion 12 as the second portion 12 is opened and closed.

An installation position of the first connector 20 and the second connector 30 along an inner circumferential surface of the connection part, an installation method, and a rotation of the third connector 40 may be modified in accordance with designing the folder type mobile terminal and designing the connection part.

Figure 6:
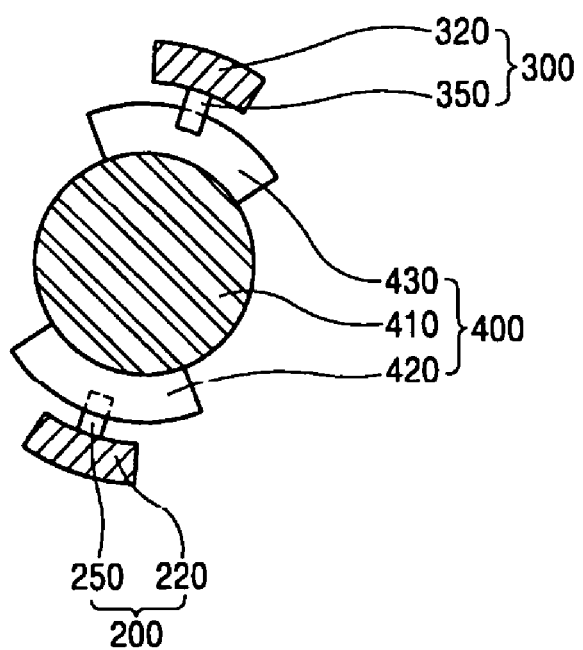

FIG. 6 is a sectional view showing a second lateral view of the signal connecting apparatus of the mobile terminal according to another embodiment of the present invention.

A signal connecting apparatus according to another embodiment of the present invention provides a first connector 200 electrically connected to the main board 16 of the first portion 11 and installed along one side of an inner circumferential surface of the connection part 13. A second connector 300 is electrically connected to the display portion 15 of the second portion 12 and installed at one side of the inner circumferential surface of the connection part 13. A third connector 400 is installed between the first connector 200 and the second connector 300 along a central axis of the connection part 13 for electrically connecting the first connector 200 and the second connector 300.

The connectors 200, 300, and 400 of the signal connecting apparatus perform a reciprocal rotation in a state of being electrically connected to one another as the first portion 11 and the second portion 12 are moved. A signal transmission is performed between the first portion 11 and the second portion 12.

The first connector 200 comprises a body 220 having a circular arc shape installed along the inner circumferential surface of the connection part 13, and a plurality of connection terminals 250 protruding towards the central axis of the connection part 13 at one side of the body 220.

The second connector 300 comprises a body 320 of a circular arc shape to be installed at the inner circumferential surface of the connection part 13, and a plurality of connection terminals 350 protruding towards the central axis of the connection part 13 on one side of the body 320.

The third connector 400 comprises a body 410 having a circular arc shape installed along the central axis of the connection part 13, a plurality of first connection terminals 420 formed at an outer circumferential surface of the body 410 and electrically connected to the connection terminals of the first connector 200, and a plurality of second connection terminals 430 electrically connected to the connection terminals of the second connector 300.

The first connection terminals 420 protrude along a circumferential direction of the body 410 of the third connector 400 with a certain length, and the second connection terminals 430 are protruded along a circumferential direction of the body 410 of the third connector 400 within a specified length.

A length of the first connection terminal 420 and the second connection terminal 430 may be modified according to a relative motion and an electrical connection state among each connector 200, 300, and 400 according to a design of the connection part 13.

The length of the first connection terminal 420 and the second connection terminal 430 can be modified according to an angle formed between the second portion and the first portion, and an electrical connection state between the second portion and the first portion.

In the signal connecting apparatus of a folder type mobile terminal according to the present invention, a plurality of connectors are constructed in the connection part serve as a medium for signal transmission between the first portion and the second portion. The signal connecting apparatus of the present invention has a high endurance against destruction due to a fatigue from repetitive opening and closing of the second portion, and a higher reliability than conventional methods upon the connection part generating a torsion force.

In the present invention, because the length of the data line are short, a capacitance between the data lines is decreased, thereby, reducing a time delay of the data line when the signal connecting apparatus is operated.

Additionally, since components of the signal carrying apparatus may be mass-produced and the components have a simple design, the fabrication cost of the mobile terminal may be reduced. If the signal connecting apparatus breaks down due to a user's carelessness, the signal connecting apparatus may be easily repaired.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The foregoing embodiments and advantages are merely exemplary and are not to be construed as limiting the present invention. The present teaching can be readily applied to other types of systems. The description of the present invention is intended to be illustrative, and not to limit the scope of the claims. Many alternatives, modifications, and variations will be apparent to those skilled in the art. Accordingly, the invention is not limited to the precise embodiments described in detail hereinabove.

What is claimed is:

1. A signal connecting apparatus for a folder type mobile terminal comprising:
    a plurality of connectors for exchanging signals between a main board of a first portion of the folder type mobile terminal and a display portion of a second portion of the folder type mobile terminal, wherein at least two of the plurality of connectors are non-planar and structured to individually rotate about at least a portion of another one of the plurality of connectors, and
    wherein the second portion is rotatably connected to open and close relative to the first portion.

2. The apparatus of claim 1, wherein the plurality of connectors comprise:
    a first connector electrically connected to the main board and installed on an inner circumferential surface of a connection part;
    a second connector electrically connected to the display portion and installed on the inner circumferential surface of the connection part; and
    a third connector installed between the first connector and the second connector passing through a central axis of the connection part for electrically connecting the first connector and the second connector, wherein the first connector and the second connector are structured to individually rotate about at least a portion of the third connector.

3. The apparatus of claim 2, wherein the first connector comprises:
    a first base plate installed on an inner circumferential surface of the connection part electrically connected to the main board.

4. The apparatus of claim 2, wherein the third connector comprises:
    a cylindrical portion installed along the central axis of the connection part, and
    third connector terminals protruding along an outer circumferential surface of the cylindrical portion and electrically connected to fast connector terminals of the first connector and second connector terminals of the second connector for providing signal electrical connectivity.

5. The apparatus of claim 3, wherein the fast connector further comprises:
    first connector terminals formed along a surface of the first base plate and electrically connected to the third connector.

6. The apparatus of claim 5, wherein the first connector terminals protrude towards the central axis of the connection part.

7. The apparatus of claim 5, wherein the first connector terminals are formed within a specified interval along a longitudinal axis of the connection part.

8. The apparatus of claim 5, wherein the second connector comprises:
    a second base plate installed on an inner circumferential surface of the connection part electrically connected to the display portion.

9. The apparatus of claim 8, wherein the second connector further comprises:
    second connector terminals formed along the surface of the second base plate and electrically connected to the third connector.

10. The apparatus of claim 9, wherein the second connector terminals protrude toward the central axis of the connection part, and are formed within a specified interval along a longitudinal axis of the connection part.

11. The apparatus of claim 10, wherein the third connector comprises:
third connector terminals protruding from an outer circumferential surface of the third connector toward an inner circumferential surface of the connection part.

12. The apparatus of claim 11, wherein the third connector terminals comprise:
first connection terminals electrically connected to the first connector terminal; and
second connection terminals electrically connected to the second connector terminal.

13. The apparatus of claim 11, wherein at least one of the third connector terminals is electrically connected to a lateral surface of at least one of the first connector terminals and the second connector terminals.

14. The apparatus of claim 11, wherein the third connector terminals are formed within a specified interval along a longitudinal axis of the cylindrical portion of the third connector.

15. The apparatus of claim 12, wherein at least one of the first connection terminals is electrically connected to a lateral surface of the first connector terminal, and at least one of the second connection terminals is electrically connected to a lateral surface of the second connector terminal.

16. The apparatus of claim 15, wherein at least one of the first connection terminals rotates relative to the second connector.

17. The apparatus of claim 15, further comprising:
an insulating layer formed along an outer circumferential surface of the third connector for facilitating signal exchange between at least one of the first connection terminals and at least one of the second connection terminals.

18. The apparatus of claim 17, wherein the insulating layer further comprises a conductive circuit pattern formed on the insulating layer.

19. The apparatus of claim 18, wherein a plurality of vias are formed on the conductive circuit pattern.

20. The apparatus of claim 15, wherein each end of at least one of the first connection terminals and at least one of the second connection terminals is distally located from the first base plate and the second base plate.

21. The apparatus of claim 15, wherein at least one of the first connection terminals and at least one of the second connection terminals protrude along a specified length along a circumferential direction of a cylindrical portion of the third connector.

22. The apparatus of claim 1, wherein the first portion defines a body of the mobile terminal and the second portion defines a folding portion of the mobile terminal.

23. A signal connecting apparatus for a folder type mobile terminal comprising:
a plurality of connectors for exchanging signals between a main board of a first portion of the folder type mobile terminal and a display portion of a second portion of the folder type mobile terminal, wherein at least two of the plurality of connectors are non-planar and structured to individually rotate about at least a portion of another one of the plurality of connectors, and
wherein the second portion is rotatably connected to open and close relative to the first portion;
wherein the plurality of connectors comprise:
a first connector electrically connected to the main board and installed on an inner circumferential surface of a connection part;
a second connector electrically connected to the display portion and installed on the inner circumferential surface of the connection part; and
a third connector installed between the first connector and the second connector passing through a central axis of the connection part for electrically connecting the first connector and the second connector, wherein the first connector and the second connector are structured to individually rotate about at least a portion of the third connector;
wherein the first connector comprises:
a first base plate installed on an inner circumferential surface of the connection part electrically connected to the main board;
wherein the first connector further comprises:
first connector terminals formed along a surface of the first base plate and electrically connected to the third connector;
wherein the second connector comprises:
a second base plate installed on an inner circumferential surface of the connection part electrically connected to the display portion;
wherein the second connector further comprises:
second connector terminals formed along the surface of the second base plate and electrically connected to the third connector;
wherein the second connector terminals protrude toward the central axis of the connection part, and are formed within a specified interval along a longitudinal axis of the connection part;
wherein the third connector comprises:
third connector terminals protruding from an outer circumferential surface of the third connector toward an inner circumferential surface of the connection part,
wherein the third connector terminals comprise:
first connection terminals electrically connected to the first connector terminal; and
second connection terminals electrically connected to the second connector terminal;
wherein at least one of the first connection terminals is electrically connected to a lateral surface of the first connector terminal, and at least one of the second connection terminals is electrically connected to a lateral surface of the second connector terminal;
wherein the apparatus further comprises:
an insulating layer formed along an outer circumferential surface of the third connector for facilitating signal exchange between at least one of the first connection terminals and at least one of the second connection terminals;
wherein the insulating layer further comprises a conductive circuit pattern formed on the insulating layer;
wherein a plurality of vias are formed on the conductive circuit pattern;
wherein the second connector further comprises:
second connector terminals formed along the surface of the second base plate and is electrically connected to the third connector, and
wherein the first base plate, the first connector terminals, the second base plate, and the second connector terminals protrude along a specified length of the connection part to form a circular arc.

24. A signal connecting apparatus for a mobile terminal comprising:
- a first connector for electrically connecting to a main board of a first portion of the mobile terminal and installed on an inner circumferential surface of a connection part;
- a second connector for electrically connecting to a display portion of a second portion of the mobile terminal and installed on the inner circumferential surface of the connection part; and
- a third connector positioned along a central axis of the connection part for electrically connecting the first connector and the second connector, wherein the first connector and the second connector are positioned relative to the third connector to individually rotate about the central axis of the connection part, and
- wherein the first connector, the second connector, and the third connector exchange signals between the main board and the display portion.

25. The apparatus of claim 24, wherein the second portion is rotatably connected to open and close relative to the first portion.

26. The apparatus of claim 24, wherein the first connector comprises:
- a first base plate installed along an inner circumferential surface of the connection part and electrically connected to the main board.

27. The apparatus of claim 24, wherein the second connector comprises:
- a second base plate installed on the inner circumferential surface of the connection part and electrically connected to the display portion.

28. The apparatus of claim 24, wherein the third connector comprises:
- a cylindrical portion installed at a center of the connection part along the central axis of the connection part, and
- third connector terminals protruding along an outer circumferential surface of the cylindrical portion, and electrically connected to the first connector and the second connector.

29. The apparatus of claim 26, wherein the first connector further comprises:
- first connector terminals formed along a surface of the first base plate and electrically connected to the third connector.

30. The apparatus of claim 27, wherein the second connector further comprises:
- second connector terminals formed on a surface of the second base plate and electrically connected to the third connector.

31. The apparatus of claim 30, wherein the second connector terminals protrude toward the central axis of the connection part, and are formed within a specified interval along a longitudinal axis of the connection part.

32. A mobile terminal, comprising:
- a first potion comprising a main board;
- a second portion comprising a display;
- a connecting structure rotatably connecting the first portion and the second portion, the connecting structure comprising:
  - a connection part;
  - a first connector electrically coupled to the main board and positioned on a portion of an inner circumferential surface of the connection part;
  - a second connector electrically coupled to the display and positioned on another portion of the inner circumferential surface of the connection part, wherein the first connector and the second connector are structured to individually rotate about a central axis of the connection part; and
  - a third connector positioned along the central axis of the connection part and structured to electrically couple the first connector and the second connector to permit signal exchange between the main board and the display.

* * * * *